United States Patent
Zeibak et al.

(10) Patent No.: US 12,010,953 B2
(45) Date of Patent: Jun. 18, 2024

(54) AGRICULTURAL TRELLIS SYSTEMS, AND ASSOCIATED DEVICES AND METHODS

(71) Applicant: Wilson OVS Acquisition Corp., Yakima, WA (US)

(72) Inventors: Zachary R. Zeibak, Yakima, WA (US); Juan R. Pinon, Yakima, WA (US); Steven W. Kuhn, Yakima, WA (US); Christian E. Siems, Paso Robles, CA (US)

(73) Assignee: Wilson OVS Acquisition Corp., Yakima, WA (US)

(*) Notice: Subject to any disclaimer, the term of this patent is extended or adjusted under 35 U.S.C. 154(b) by 0 days.

(21) Appl. No.: 17/562,735

(22) Filed: Dec. 27, 2021

(65) Prior Publication Data
US 2022/0201944 A1 Jun. 30, 2022

Related U.S. Application Data

(60) Provisional application No. 63/132,224, filed on Dec. 30, 2020.

(51) Int. Cl.
*A01G 17/06* (2006.01)
(52) U.S. Cl.
CPC .................................. *A01G 17/06* (2013.01)
(58) Field of Classification Search
CPC .... A01G 17/06; A01G 9/12; A01G 2017/065; A01G 17/04
USPC ............................................................ 47/46
See application file for complete search history.

(56) References Cited

U.S. PATENT DOCUMENTS

| | | | | |
|---|---|---|---|---|
| 80,104 | A | * 7/1868 | Wilber | A01G 9/12 47/44 |
| 3,690,033 | A | * 9/1972 | Lewis | A01G 17/06 47/46 |
| 5,797,214 | A | 8/1998 | Parrish et al. | |

(Continued)

FOREIGN PATENT DOCUMENTS

CH 685187 A5 * 4/1995 ............. A01G 17/06

OTHER PUBLICATIONS

International Searching Authority, International Search Report and Written Opinion of PCTUS2021/065247 mailed Mar. 15, 2022; 12 pages.

*Primary Examiner* — Brady W Frazier
*Assistant Examiner* — Zoe Tam Tran
(74) *Attorney, Agent, or Firm* — Christensen O'Connor Johnson Kindness PLLC

(57) ABSTRACT

An agricultural trellis system is provided and generally includes an anchor stake configured to extend at least partially into the ground, a mounting plate coupled to the anchor stake, and at least one trellis arm pivotably coupled to the mounting plate. The mounting plate can have a pivot aperture, a first plate aperture, and a second plate aperture configured to position the trellis arm at different angles relative to a plane orthogonal to a major axis of the anchor stake. The trellis arm is pivotable between alignment with the first plate aperture and disposed at a first angle, and alignment with the second plate aperture and disposed at a second angle different than the first angle. A pin can couple the trellis arm to the mounting plate via the first or second plate apertures. In use, the system can have two trellis arms disposed at the same or different angles.

18 Claims, 8 Drawing Sheets

(56) References Cited

U.S. PATENT DOCUMENTS

| | | | |
|---|---|---|---|
| 6,138,407 A * | 10/2000 | Pierce, Jr. | A01G 17/06 47/46 |
| 6,378,245 B1 * | 4/2002 | Summers | A01G 17/06 47/45 |
| 7,249,439 B2 | 7/2007 | Pierce | |
| 2003/0101642 A1 * | 6/2003 | Parrish | A01G 17/06 47/46 |
| 2005/0252076 A1 * | 11/2005 | Schloesser | A01G 17/06 47/46 |
| 2013/0333283 A1 * | 12/2013 | Patterson, Sr. | A01G 17/14 47/45 |
| 2017/0118924 A1 * | 5/2017 | Parrish | A01G 9/126 |
| 2018/0288951 A1 | 10/2018 | Di Battista et al. | |

\* cited by examiner

AGRICULTURAL TRELLIS SYSTEMS, AND ASSOCIATED DEVICES AND METHODS

CROSS-REFERENCE TO RELATED APPLICATION(S)

The present application claims priority to U.S. Provisional Patent Application No. 63/132,224, entitled AGRICULTURAL V-TRELLIS SYSTEMS, AND ASSOCIATED DEVICES AND METHODS, filed Dec. 30, 2020, the disclosure of which is incorporated herein by reference in its entirety.

TECHNICAL FIELD

The present disclosure is generally directed to agricultural trellis systems (e.g., V-trellis systems), including modular V-trellis systems having independently adjustable arms, and associated devices and methods. Such systems can be used, for example, for fruit-bearing trees and vines.

BACKGROUND

Trellis systems are used to increase production in fruit- and nut-bearing tree and vine crops by diverting a portion of the allocation of biomass production from structural development into fruit production and growth. Free-standing fruit trees devote a large portion of their biomass production to establishing the structural scaffold required to support the weight of a fruit crop, especially during the years of growth following planting. Trellis structures generally include a series of support members with horizontal wires extending along the row of the crop. The tree or vine is tied or clipped to the wires, relieving the crop of developing as robust of a trunk and branch structure scaffold. Fruit- and nut-bearing trees and vines grown with a trellis system typically experience increased precocity, producing their first commercial crops earlier than non-trellised crops, and have a higher crop yield per acre over the life of the orchard.

Some trellis systems are configured to bend the trunks and/or branches of the plant away from vertical to increase hormonal growth responses and divert more growth energy to fruit production. Using such trellis systems, the branches can be trained to grow on planes of parallel wires, and pruning the branches to situate the fruit buds along the wires creates a gridwork of fruit with uniform exposure to sunlight. In contrast, a standing tree or vine has fruit with greater sunlight exposure near the top and on outer branches, and fruit with less sunlight exposure near the bottom of the tree or on inside branches, causing disparate ripening rates. Training the crop using trellis structures can also condense the fruiting zone to facilitate machine harvesting from mechanical platforms conveyed along the crop row, eliminating the need for workers to manually climb ladders to pick fruit.

Conventional trellis systems include vertical or angled supports, carrying a series of wires to which the crop is coupled. Trellis systems with angled supports typically include two supports forming a "V" and creating two fruiting walls or surfaces for every row of plants. Crop yields of V-trellis systems generally exceed those of vertical trellis systems. Conventional V-trellis systems include wood or steel posts driven into the soil to form a crossing "X" configuration, with the intersection of the posts just above ground level. The posts are then bolted together at the intersection and a horizontal support brace spans the two arms of the "V," generally around the midpoint of the height of the arms. In other conventional V-trellis systems, an anchor stake is driven into the soil. Then the arms of the "V" are attached to a bracket of the anchor stake at a desired angle.

DETAILED DESCRIPTION

Figure 1:
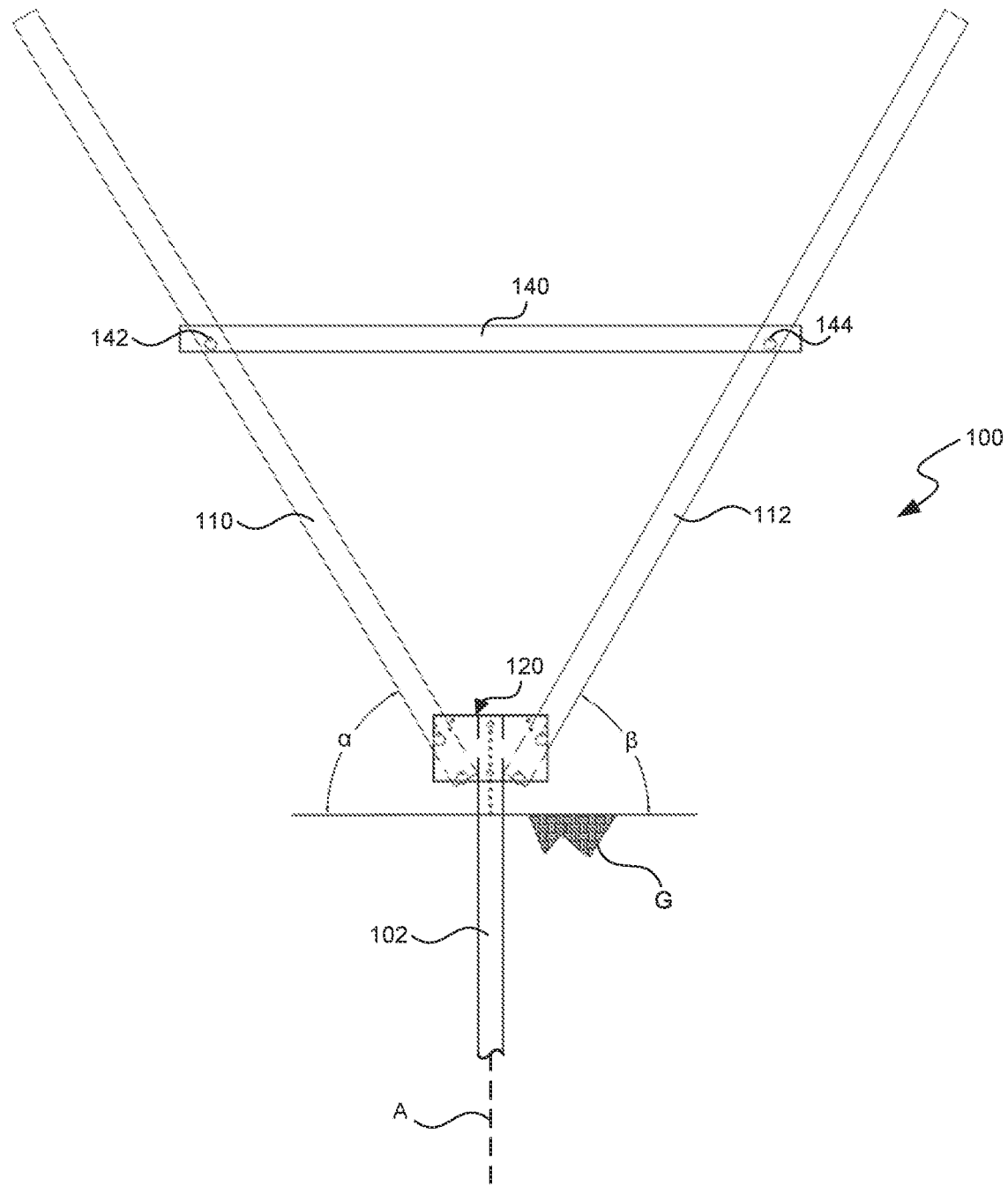
FIG. 1 is a front elevation view of a trellis assembly configured in accordance with embodiments of the present technology.

The following disclosure describes various embodiments of agricultural trellis systems (e.g., V-trellis systems) having adjustable components to allow various installation configurations. Trellis systems may be used with fruit-bearing trees and vines to increase: (a) precocity, producing first crops earlier than non-trellised crops; (b) fruit and nut uniformity; and/or (c) crop yield per orchard acre over the life of the plants. The adjustable trellis systems of the present technology include arms positionable at various mounting angles and heights with respect to the ground. Such trellis systems may include adjustability and one or more components of the trellis assembly such that a user can tailor the trellis system based on orchard characteristics (e.g., crop type, varietal, terrain topography, sun exposure, drainage, etc.) to maximize the production of the crops. The arms of conventional trellis systems are both positioned at the same angle with respect to the ground, and cannot be adjusted. The arms of the trellis assemblies of the present technology can be adjusted independently of each other arm and at any time during use of the trellis system, such as during the growth cycle of the plants. For purposes of explanation, several examples of the present technology are described in the context of V-trellis systems, but the technology can be applied to trellis systems that may not have a strictly "V-shaped" configuration.

V-trellis systems include parallel horizontal wires clipped to the upwardly extending arms of the trellis assembly, e.g., at about 12 to 24 inch intervals. The wires are generally attached to reinforced anchor posts at the ends of the crop row and are then placed under tension. A portion of the tree or vine is tied or clipped to the horizontal wires as the plant grows vertically, and during growth, the branches are bent and tied (e.g., trained) to the wires of one of the arms. In some embodiments, the branches are bent and trained at a generally horizontal position. In some conventional V-trellis systems, the apex of the "V" is established at ground level, and the two arms extend upward and outward from the apex; however, V-trellis systems of the present technology include an apex of the "V" having an adjustable height with respect to the ground. The V-trellis systems described herein can create dual fruiting walls or surfaces in each row of plants, providing increased crop yield compared to conventional trellis systems.

As described in greater detail below, embodiments of the V-trellis systems described herein include arms positionable at various mounting angles. The optimal angle of each arm may be determined based on orchard characteristics. For example, arms placed at a larger angle from the ground (e.g., more vertically positioned) can be more amenable to harvesting using mechanical platforms and can provide increased sun exposure to fruit closer to the ground, promoting ripening; however, such configurations can overexpose sensitive fruit varieties (e.g., honeycrisp apples). Arms placed at a smaller angle from the ground (e.g., more horizontally position) increases the growth of branches and foliage between the arms of the V-trellis assembly, which can be advantageous for certain types of fruit by creating additional fruiting buds; however, this can be detrimental for other types of fruit by diverting growth energy away from fruit production into vegetative growth and creating branches that are difficult to reach and prune through the V-trellis system and plants. In this regard, the adjustable V-trellis systems of the present technology can allow the user to select the angle, e.g., the optimal angle of the arms based on desired yield of the crops, cost of harvest, quality of fruit, target ripeness, etc. For example, citrus growth may be optimal at a smaller angle, while apple growth may be optimal at a larger angle.

Certain details are set forth in the following description and in FIGS. 1-5 to provide a thorough understanding of various embodiments of the present technology. In other instances, well-known structures, systems, materials and/or operations often associated with agricultural trellis structures are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth. The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology, and unless expressly indicated (e.g., in the claims), are not intended to be limiting of its scope. The sizes of various depicted elements are not necessarily drawn to scale, and these various elements may be arbitrarily enlarged to improve legibility. Component details may be abstracted in the Figures to exclude details such as component position and/or certain precise connections between such components when such details are unnecessary for a complete understanding of how to make and use the technology. Additionally, many of the details, dimensions, angles, and/or other features shown in the Figures are merely illustrative of particular embodiments of the disclosure. Accordingly, other embodiments can have other details, dimensions, angles and features without departing from the present technology. Those of ordinary skill in the art will also appreciate that further embodiments of the technology can be practiced without several of the details described below. In the Figures, identical reference numbers identify identical, or at least generally similar, elements.

FIG. 1 is a front elevation view of a trellis assembly ("assembly 100") configured in accordance with embodiments of the present technology. The assembly 100 has an anchor stake 102 extending at least partially into the ground G to provide a foundation for the components of the assembly 100 and the trees or vines coupled to wires between multiple assemblies 100 of the V-trellis system. The anchor stake 102 can be configured to couple to a mounting plate assembly 120 at least one position along the height of the anchor stake 102, which will be explained in greater detail below. The mounting plate assembly 120 is configured to support at least a first arm 110 and a second arm 112 extending upwardly from the mounting plate assembly 120. The first arm 110 can be positioned at a first angle α relative to a plane orthogonal to the major axis A of the anchor stake 102 (e.g., represented in the figures by the ground G, which is orthogonal to the major axis A when the anchor stake 102 is positioned vertical relative to a horizontal ground surface) and the second arm 112 can be positioned at a second angle R from the ground G. In some installation configurations of the assembly 100 (e.g., the installation configuration shown in FIG. 1), the first and second angles α and R are at least approximately equal; however, in other installation configurations the angles α and R can differ, with the arms 110 and 112 positioned differently from each other with respect to the ground G (see, e.g., FIG. 2B). In some embodiments, the assembly 100 can have a cross support 140 extending between the first and second arms 110 and 112 at an intermediate height, coupled to the first arm 110 with a first cross support pin 142 and coupled to the second arm 112 with a second cross support pin 144.

Figure 2A:
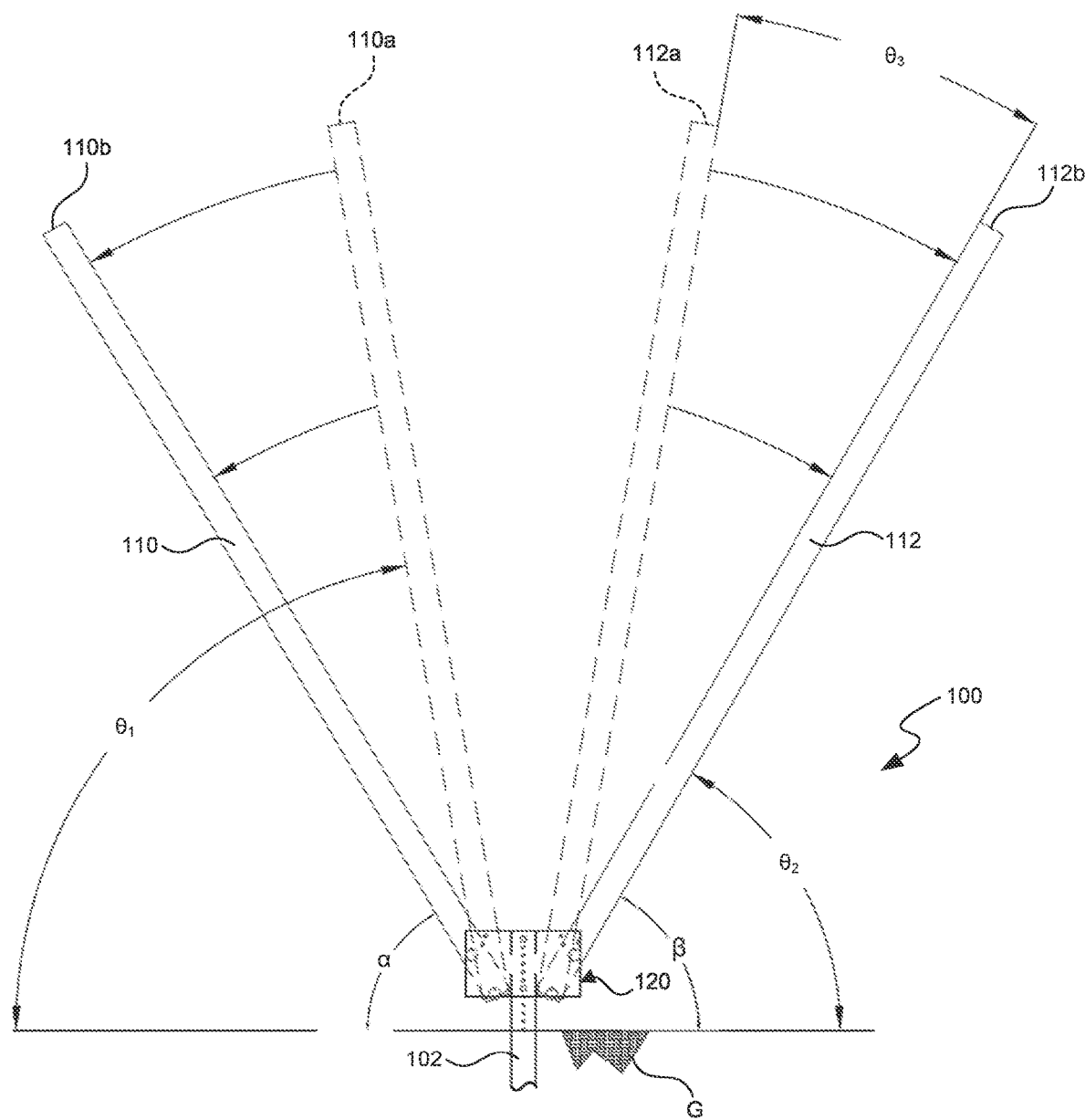
FIGS. 2A and 2B are enlarged front elevation views of the trellis assembly of FIG. 1, showing various angular positions of support arms of the trellis assembly.
Figure 2B:
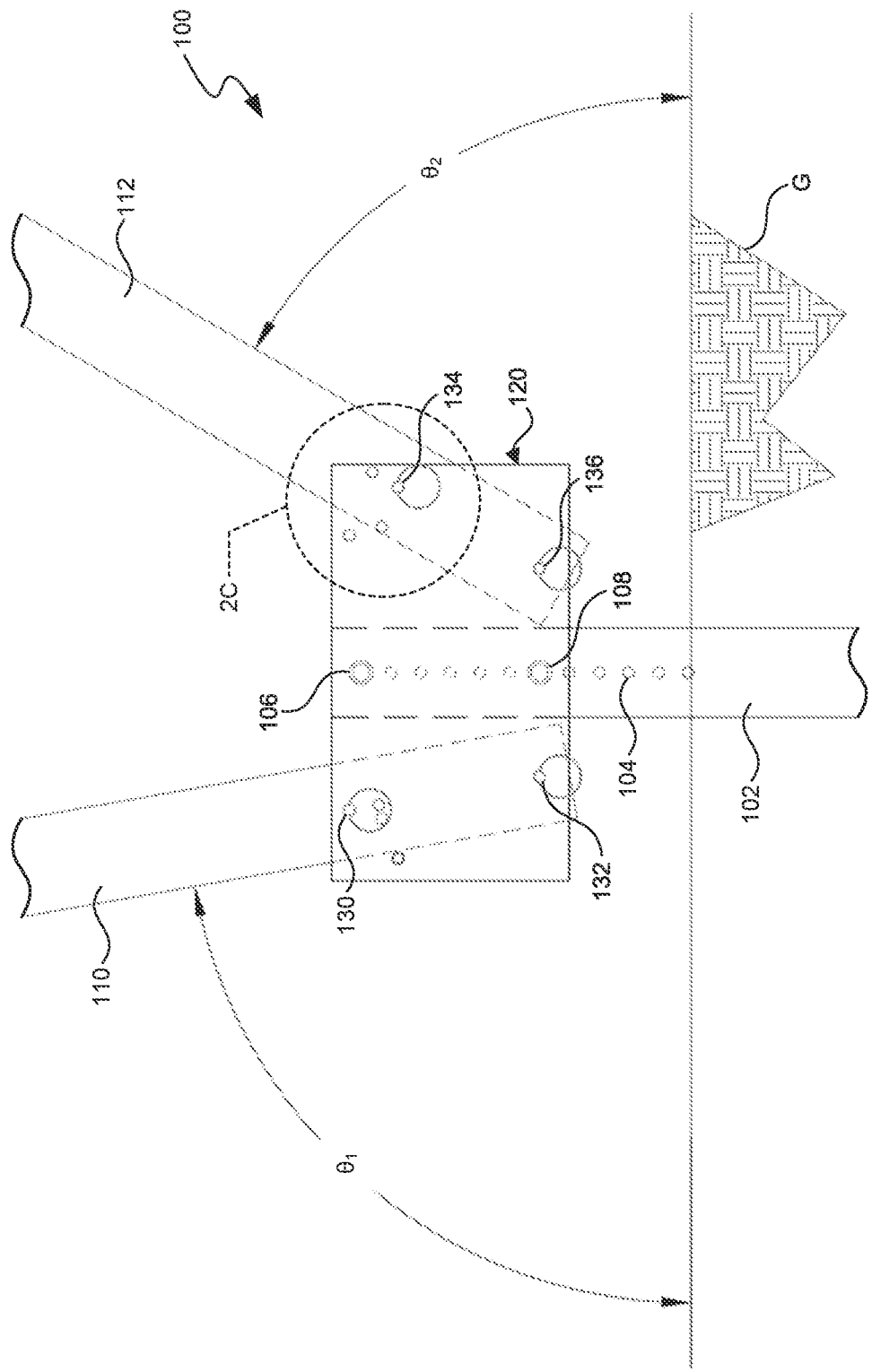
Figure 2C:
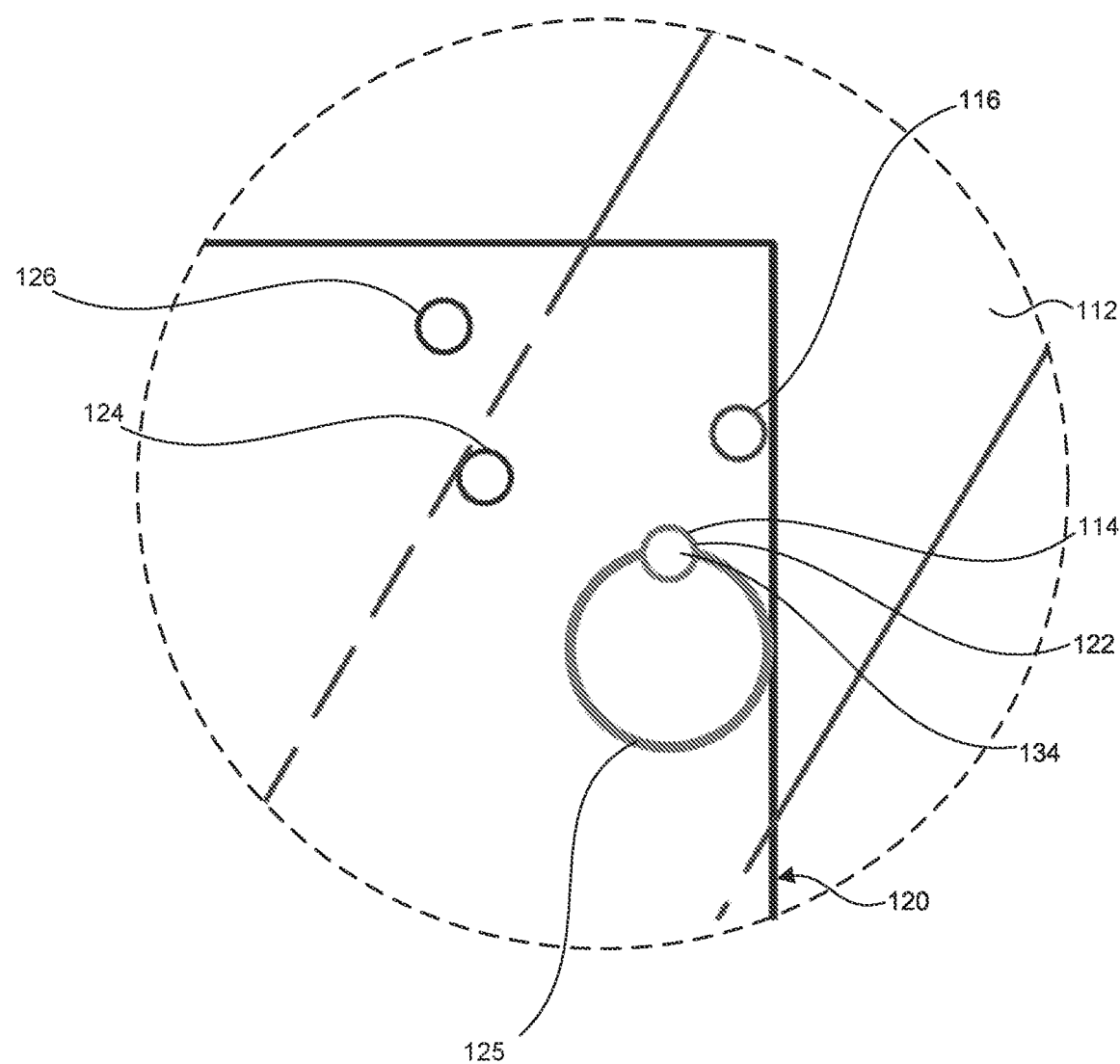
FIG. 2C is a section view of the trellis assembly of FIG. 1, showing detail within the border indicated in FIG. 2B.

FIGS. 2A and 2B are enlarged front elevation views of the assembly 100, showing examples of various angular positions of the first and second arms 110 and 112, and FIG. 2C is a section view of the assembly 100, showing detail within the border indicated in FIG. 2B. As shown in FIG. 2A, the first arm 110 is movable between at least two positions: a first position 110a at a greater, more vertical angle $\theta_1$ from the ground G (e.g., 80°), and a second position 110b at a smaller, less vertical angle (shown as angle α in FIG. 2A) from the ground G (e.g., 60°). Similarly, the second arm 112 is movable between at least two positions: a first position 112a at a greater, more vertical angle $\theta_2+\theta_3$ from the ground G (e.g., 80°), and a second position 112b at a smaller, less vertical angle $\theta_2$ from the ground G (e.g., 60°). In some embodiments, any number of intermediate positions (e.g., one intermediate position between the first and second positions for three total positions, two intermediate positions, etc.) for the first and second arms 110 and 112 are suitable for use with V-trellis systems of the present technology. In embodiments of the assembly 100, the angles α and R can range from 0° to 90°, e.g., between about 45° and about 85°, between about 60° and about 80°, or between about 75° and about 80° from the ground G. The range of adjustment of the first and second arms 110 and 112 between the first positions 110a and 112a, respectively, and the second positions 110b and 112b, respectively, can be any suitable angle, e.g., 10°, 20°, 30°, 40°, etc. As shown in FIG. 2A, for example, the range of adjustment of the first and second arms 110 and 112 can be 20°.

Turning to FIG. 2B, the anchor stake 102 has a series of apertures 104 for coupling the mounting plate assembly 120 to the anchor stake 102. The mounting plate assembly 120 can include a first fastener 106 and a second fastener 108 configured to extend through the apertures 104 and set the height of the mounting plate assembly 120 above the ground G. As shown, the first and second arms 110 and 112 can be pivotably coupled to the mounting plate assembly 120 with a first base pin 132 securing an end of the first arm 110, and a second base pin 136 securing an end of the second arm 112. The angular position of the first and second arms 110 and 112 can be fixed with respect to the mounting plate assembly 120 by a first adjustment pin 130 securing the first arm 110 at the first angle $\theta_1$, and a second adjustment pin 134 securing the second arm 112 at the second angle, $\theta_2$. In other embodiments, the first and second adjustment pins 130 and 134 can secure the first and second arms 110 and 112, respectively, at any other suitable angles, e.g., 70°, 72°, 75°, 78°, etc.

As shown in the detailed view of FIG. 2C, the second adjustment pin 134 can secure the second arm 112 in a plurality of angular positions. The second adjustment pin 134 can include a ring 125 that a user can grasp, allowing the pin 134 to be installed and removed without tools. In this regard, the second arm 112 may include a first arm aperture 114 and a second arm aperture 116 spaced apart from the first arm aperture 114. The mounting plate assembly 120 may include first and second lower plate apertures 122 and 124 configured to align with the first arm aperture 114 as the second arm 112 swings about an axis at the pivotable coupling of the second base pin 136 (FIG. 2B), and can include at least an upper plate aperture 126 configured to align with the second arm aperture 116. In the illustrated embodiment, when the first aperture 114 is aligned with the first lower plate aperture 122, the second arm 112 will be positioned at the second position 112b (FIG. 2A) corresponding to the smallest second angle β. Similarly, when the second arm aperture 116 is aligned with the upper plate aperture 126, the second arm 112 is positioned at the first position 112a (FIG. 2A) corresponding to the largest second angle β. Additionally, when the first arm aperture 114 is aligned with the second lower plate aperture 124, the second arm 112 will be positioned at an intermediate position between the first position 112a and the second position 112b. Additional arm apertures and plate apertures allowing different positions of the second arm 112 are also within the scope of the present technology. Although the pins 130, 132, 134, and 136 are depicted as quick-release pins in the Figures, any suitable fastener can be used to secure the first and second arms 110 and 112 of the assembly 100. A mirror symmetric configuration or a different configuration of apertures can be used in conjunction with the first arm 110 (see, e.g., FIGS. 4A and 4B).

Figure 3:
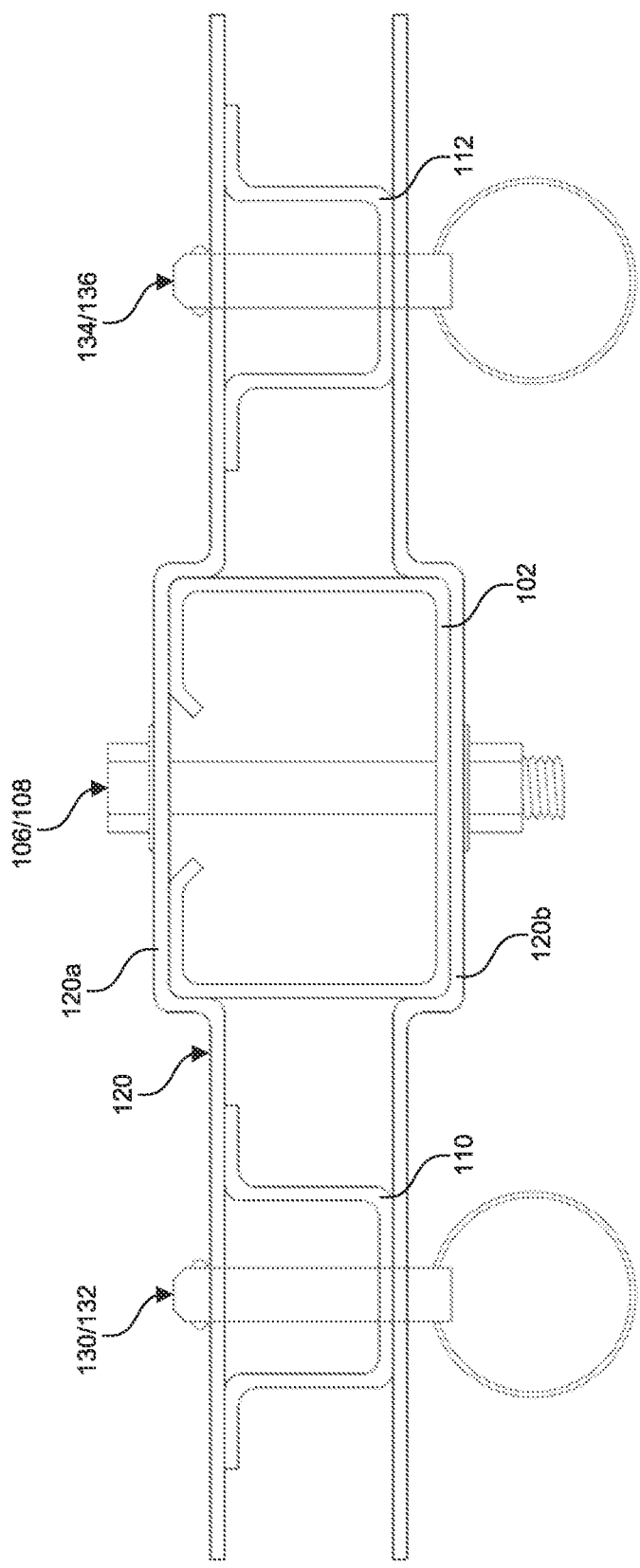
FIG. 3 is a cross-sectional plan view of the trellis assembly of FIG. 1.

FIG. 3 is a cross-sectional plan view of the assembly 100, showing the mounting plate assembly 120 coupled to the anchor stake 102. The mounting plate assembly 120 has a first mounting plate 120a and a second mounting plate 120b that can be mirror symmetric to the first mounting plate 120a. The first and second mounting plates 120a and 120b are configured to interface with the anchor stake 102 such that the mounting plate assembly 120 does not move vertically with respect to the ground G or laterally with respect to the anchor stake 102. The first and second fasteners 106 and 108 couple the mounting plate assembly 120 to the anchor stake 102, capturing the anchor stake 102 between the first and second mounting plates 120a and 120b. Although two fasteners 106 and 108 are shown in the Figures, any number of fasteners can be used to couple the mounting plate assembly 120 to the anchor stake 102. As shown, when assembled, the pins 130, 132, 134, and 136 extend through the first and second mounting plates 120a and 120b and the corresponding first and second arms 110 and 112 to secure the arms with respect to the mounting plate assembly 120. Although the first and second arms 110 and 112 are shown as a general hat section (e.g., formed in sheet metal, extruded, etc.), in other embodiments the first and second arms 110 and 112 can be any suitable shape, such as round, oval, square, rectangular, etc., and can be longer or shorter than depicted herein based on crop type, climate, machinery, the use of agricultural fabrics, and/or other suitable considerations.

Figure 4A:
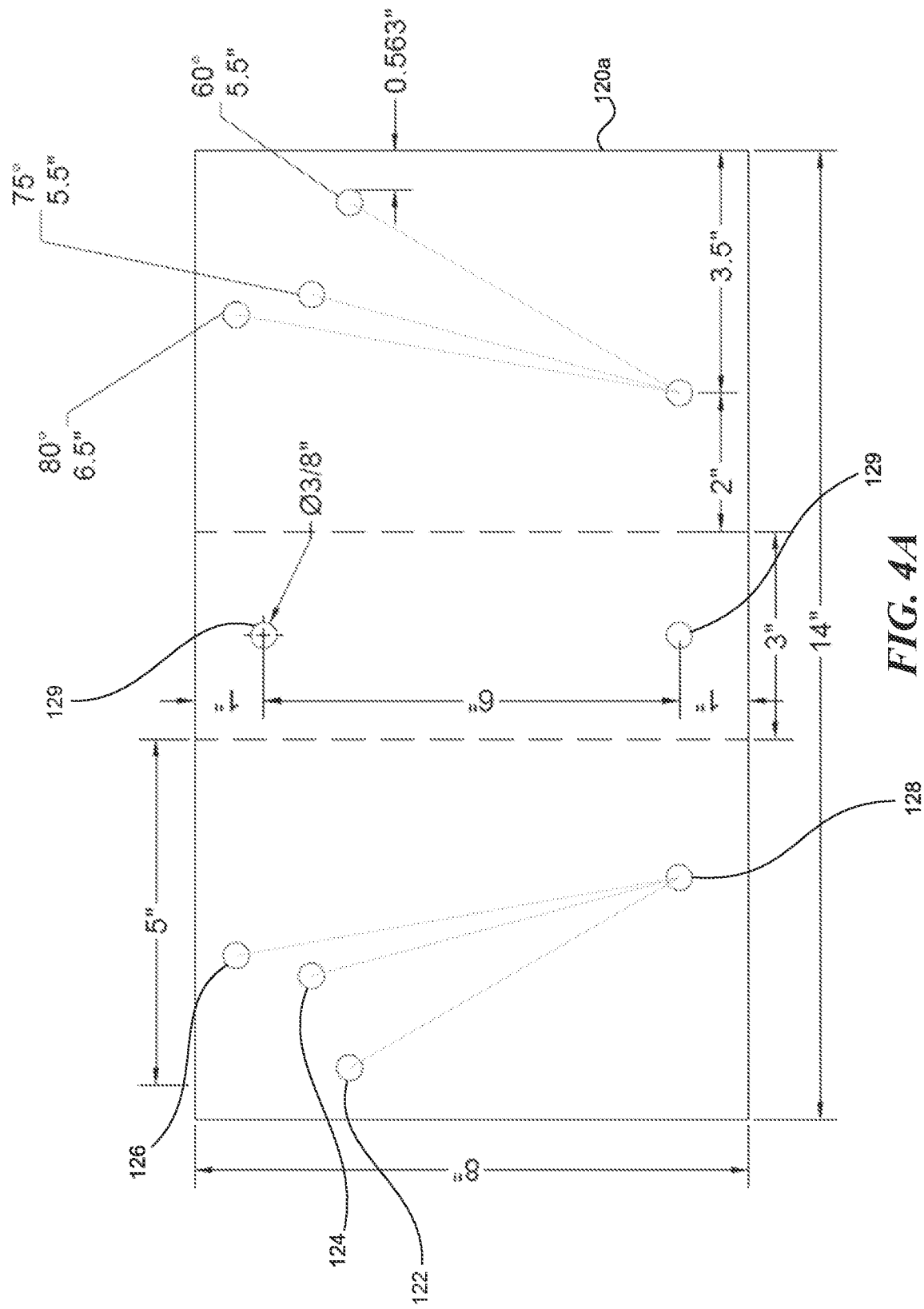
FIGS. 4A and 4B are front elevation views of embodiments of mounting plates of the trellis assembly of FIG. 1.
Figure 4B:
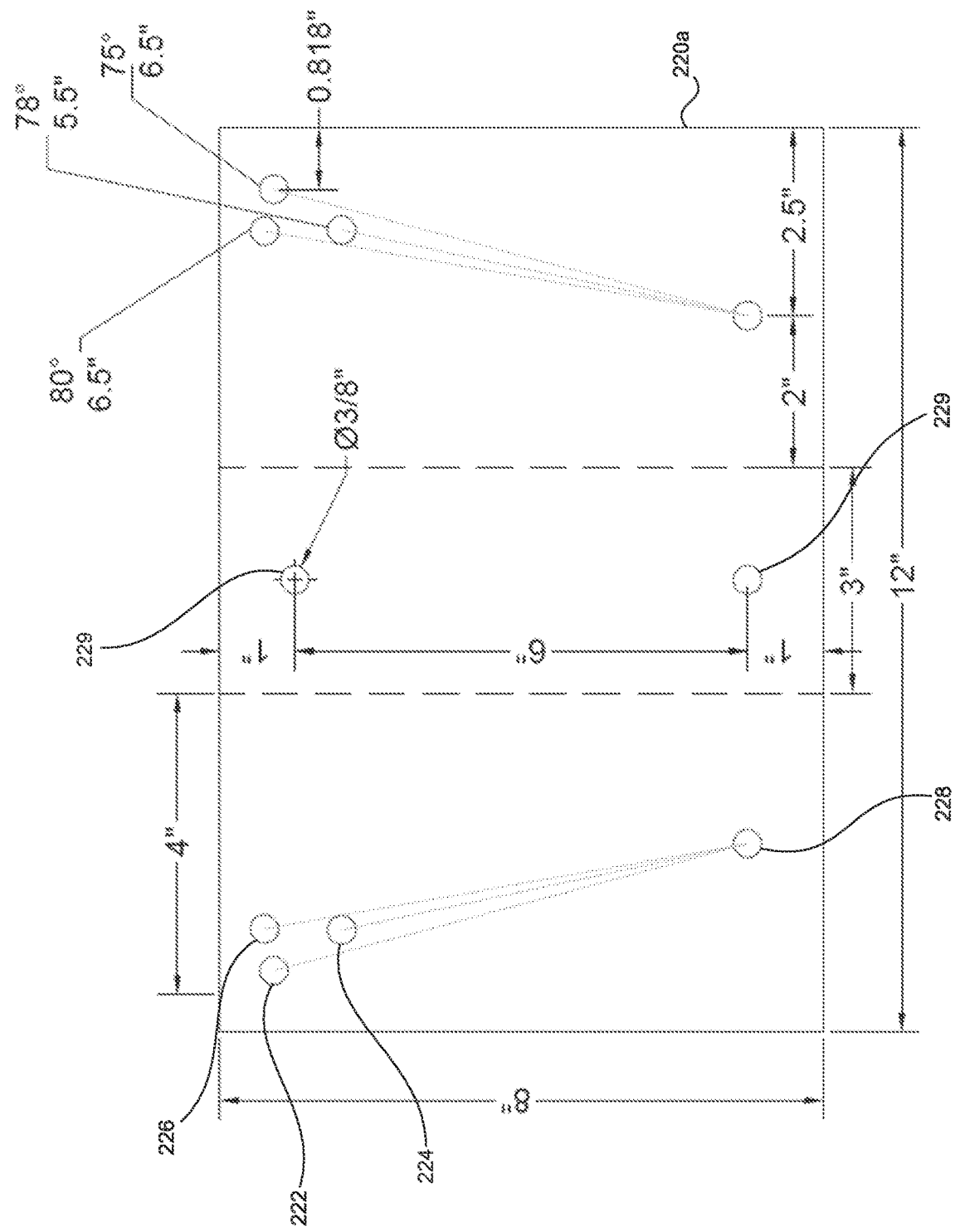

FIGS. 4A and 4B show embodiments of the first mounting plate 120a of the assembly 100. FIG. 4A shows a first configuration of the first mounting plate 120a having the lower plate apertures 122 and 124, and the upper plate aperture 126 for adjusting the angle of the first and second arms 110 and 112. The mounting plate 120a further includes a pivot aperture 128 for pivotably coupling the first and second arms 110 and 112 to the mounting plate 120a, and anchor stake apertures 129 for fixing the height of the mounting plate 120a with respect to the ground G. As shown, the mounting plate 120a is configured to secure the first and second arms 110 and 112 at angles α and β of 60°, 75°, and 80°; however, the mounting plate 120a can be configured for any suitable angles α and β. The angular positions of the mounting plate 120a can be selected based on regional crops, climate, and/or other suitable parameters. For example, angles α and β of 60°, 75°, and 800 may generally be suitable for climates similar to those in California, among other areas.

FIG. 4B shows a second configuration of a mounting plate 220a, which is similar to the mounting plate 120a described above, except with a different configuration of apertures allowing different angular positions of the arms for interfacing with the anchor stake 102. The mounting plate 220a has multiple upper plate apertures 222 and 226, and a lower plate aperture 224 for adjusting the angle of the first and second arms 110 and 112 with respect to the ground G. The mounting plate 220a further includes a pivot aperture 228 for pivotably coupling the first and second arms 110 and 112 to the mounting plate 220a, and anchor stake apertures 229 for fixing the height of the mounting plate 220a with respect to the ground G. As shown, the mounting plate 220a is configured for securing the first and second arms 110 and 112 at angles α and β of 75° (aperture 222), 78° (aperture 224), and 800 (aperture 226); however, the mounting plate 220a can be configured for any suitable value of angles α and β. The angular positions of the mounting plate 220a can be selected based on regional crops and/or climate. For example, angles α and β of 75°, 78°, and 80° may generally be suitable for climates similar to those in Washington State, among other areas.

Figure 5:
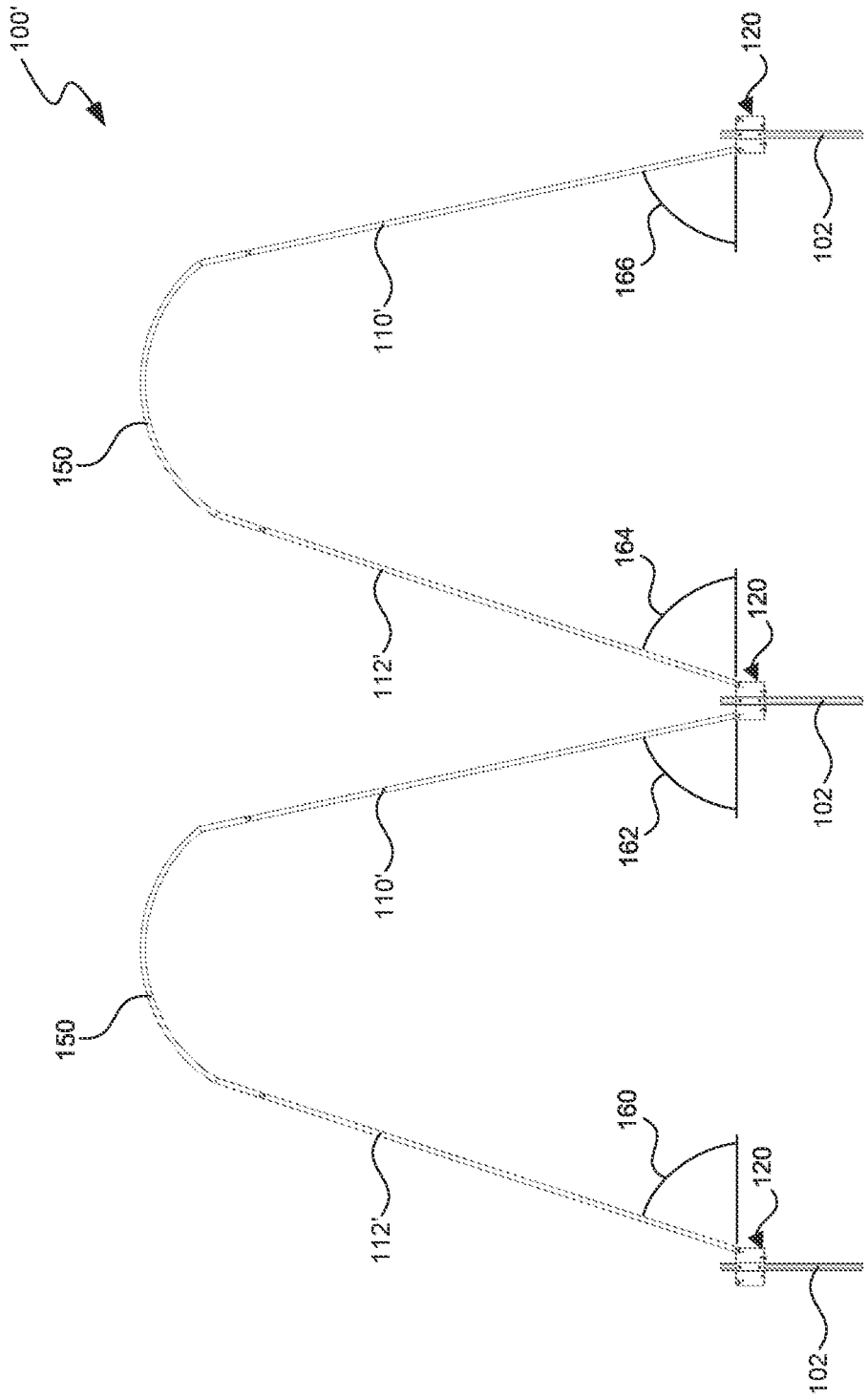
FIG. 5 is a front elevation view of a trellis assembly configured in accordance with embodiments of the present technology.

FIG. 5 is a front elevation view of a V-trellis assembly ("assembly 100'") configured in accordance with embodiments of the present technology. The assembly 100' is similar in configuration to the assembly 100 of FIG. 1 described above, but includes additional components for installing agricultural fabrics, such as shade cloth, bird netting, and/or rain cover above the trees or vines. FIG. 5 shows three mounting plate assemblies 120 coupled to anchor stakes 102 (e.g., representing three separate rows of a crop). The mounting plate assemblies 120 can include a first arm 110' and a second arm 112', which can be longer and/or a different shape from the first and second arms 110 and 112 described above. In the illustrated embodiment, the first and second arms 110' and 112' are round to accommodate a hoop 150 spanning between the first arm 110' of one row and the second arm 112' of an adjacent row. The hoop 150 can increase the stability of the assembly 100' and eliminate the need for one or more of the cross braces 140, or the hoop 150 be used in conjunction with the cross brace 140 to, e.g., reduce the material thickness, shape, size, etc. of the remaining components of the system 100'.

The hoop 150 can further support and suspend a canopy of agricultural fabric, such as shade cloth, bird netting, or rain cover above the trees or vines. As noted above, in some embodiments, the first and second arms 110' and 112' can be adjusted to different angles from the ground based on user preference. FIG. 5 shows a first angle 160 of the second arm 112', a second angle 162 of the first arm 110', a third angle 164 of the second arm 112', and a fourth angle 166 of the first arm 110'. In the illustrated embodiment, the second and fourth angles 162 and 166 are larger, more vertical angles than the first and third angles 160 and 164. In an example, the second and fourth angles 162 and 166 are 78° and the first and third angles 160 and 164 are 72°; however, any suitable value for the angles 160, 162, 164, and 166 is within the scope of the present technology. In configurations with different angles between adjacent first and second arms 110' and 112', the hoop 150 spanning the rows is configured to attach to the ends of the first and second arms 110' and 112' at the angle the arms are positioned (e.g., one end of the hoop 150 is configured to attach to the first arm 110' disposed at the second angle 162, and the other end of the hoop 150 is configured to attach to the second arm 112' disposed at the first angle 160.)

EXAMPLES

The anchor stake 102 shown generally to FIG. 1 can be driven into the ground G to provide a foundation for the assembly 100. The anchor stake 102 can be between three feet long, with two feet driven into the soil, and twenty feet long, with up to five feet driven into the soil. Other lengths are also within the scope of the present technology, where the anchor stake 102 can have any suitable length and driving depth to further support and suspend a canopy of agricultural fabric, such as shade cloth, bird netting, or rain cover above the trees or vines, e.g., by using the hoop connectors 150 of FIG. 5. The anchor stake 102 can be formed from commercially available post material (e.g., RIB-BAK® u-channel posts—of NUCOR® Corporation) which generally includes u-channel steel with ⅜" bolt holes drilled every 1 inch on center, or the anchor stake 102 can be a roll-formed profile with ⅜-inch bolt holes on 1-inch centers. Other configurations are also suitable for the anchor stake 102.

The mounting plates 120a, 120b, and 220a can be about 8-inches high by between 11 to 15-inches wide. The mounting plates can have L bends and reverse L bends in order to accommodate an anchor stake of approximately 2 inch width, while also capturing the arms which can be 1-inch in thickness (e.g., as shown in FIG. 3). The angles α and β created by using a plate aperture (e.g., the apertures 122, 124, 126, 222, 224, 226, etc.) can be marked or stamped on the mounting plate. In some embodiments, the mounting plates can have an L-bend along the bottom edge which would rest on the soil and provide lateral stability to the system, and/or an L-bend along the top edge to provide lateral stability to the system. Versions of the mounting plates beyond those shown in the Figures are also within the scope of the present technology, such as mounting plates with apertures only for the angles the user is most likely to use, so as to prevent the mounting plate from weakening by drilling extraneous holes to accommodate unneeded angular positions of the arms.

The arms 110 and 112 shown in FIGS. 1 and 3 can be roll formed profiles produced from flat strips of steel, can be circular or square tubing, or can be any other suitable cross-sectional shape. The arms can be inserted between the two mounting plates and attached at the desired angle using the pins. The arms can be made in a range of lengths depending on the desired height of the V-Trellis system, and in a range of thickness based on the strength needed and crop load expected. The arms can have notches into which the horizontal trellis wires are placed so as to maintain the desired spacing between the wires. The horizontal trellis wires can be received in the pre-punched notches until they are placed under tension, or they can be clipped to the arms. The arms can be galvanized (zinc coated), plain steel, or other suitable materials. The arms can have holes punched or drilled into them near the base for: (a) attachment to the mounting plates at the desired angle(s); (b) at an intermediate position along the length of the arms for attaching the cross brace 140; and/or (c) near the upper end for attaching additional components, such as another length of arm in order to extend the height of the system, a further cross brace or rounded member to attach the arm of one assembly 100 to the arm of the adjacent assembly 100 for increased stability, and/or a hoop 150 to accommodate further installation of agricultural fabrics, etc. Apertures of the arms, mounting plates, and/or the anchor stake may be oblong or slotted to accommodate tolerance differences and/or the corresponding apertures in other components that have inconsistent spacings.

The cross brace 140 shown in FIG. 1 can be formed from 10 to 14 gauge steel and can be plain, galvanized, and/or otherwise treated. The cross braces can be roll formed or stamped to an L-shape or other structural profile. Apertures can be drilled or punched toward the ends of the cross braces and configured to align with the cross brace bolt holes drilled or punched in the arms. The cross braces can be expandable, allowing the user to change the angle of the V-trellis assembly as needed. The hoop 150 shown in FIG. 5 can be formed from 10 to 14 gauge steel and can be plain, galvanized, or otherwise treated, and can be formed to fit the angular position of the arms, e.g., when the arms are at different angular positions as shown in FIG. 5.

The pins 130, 132, 134, 136, 142, and 144 shown in FIGS. 1-3 may comprise spring ball locking quick release (detent) pins to releasably couple the arms to the mounting plates. The pivoting coupling of the arms 110 and 112 at the pins 132 and 136 can alternatively be a fixed bolt, since adjustability is generally performed using the upper pins 130 and 134, which can be readily removed, and then reinserted after the arm angle is changed.

V-Trellis systems with a range of arm angles can be assembled from compatible components, such that the user can incorporate a variety of components in different installations and benefit from increased customization and short order lead times. Users of conventional trellis systems typically order custom/bespoke trellis systems and wait for such systems to be manufactured. Component parts of the present technology V-trellis systems are modular and can be combined to create assemblies with a range of angles and crop load bearing strengths. Using such modularity, the components can be manufactured in large quantities in advance, creating economies of scale that reduce costs.

The optimal angles of the arms can be determined by the user performing a complex analysis of the desired return on investment, fruit ripeness, etc., and weighing the effect of many other factors. The functional life of a V-trellis system is approximately 20 to 25 years. If the user initially determines the optimal angle is 75°, for example, the user may later realize that profitability would be optimal at 80°.

Conventional V-Trellis systems do not include features that allow the angle of the trellis arms to be adjusted. As such, the user must determine the optimal angle at the time of ordering. The present technology allows the user to change the angle of the V-trellis arms without the significant cost of removing the system and installing a system with alternative arm angles. The angle of the V-trellis arms can be changed after the system is installed to stimulate early or more prolific fruit production. There are instances in which it is advantageous to the farmer to train the trees or vines to a certain angle, and then later bend them outward to a less vertical angle to trigger chemical hormonal growth responses in the plant that stimulate fruit production.

The V-trellis arms can each be set to different angles to increase (e.g., optimize) productivity and return on investment. For example, in situations for which tree or vine rows run north to south, the V-Trellis creates two planes or walls of fruit facing east and west. Conventional V-Trellis systems force users to choose a single angle for both east- and west-facing fruiting surfaces. Typically, the angle that is optimal for an east-facing surface is not the same as the angle that is optimal for a west-facing surface.

Conclusion

References throughout the foregoing description to features, advantages, or similar language do not imply that all of the features and advantages that may be realized with the present technology should be or are in any single embodiment of the technology. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, for fluid (e.g., air) transfer, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. As used herein, the phrase "and/or," as in "A and/or B" refers to A alone, B alone, and both A and B. The terms "approximately," "about," "generally," and the like refer to values within ±10% of the stated value.

The above Detailed Description of examples and embodiments of the present technology is not intended to be exhaustive or to limit the technology to the precise form disclosed above. While specific examples for the technology are described above for illustrative purposes, various equivalent modifications are possible within the scope of the technology, as those skilled in the relevant art will recognize. The teachings of the present technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements. Further any specific numbers noted herein are only examples: alternative implementations may employ differing values or ranges. To the extent any materials incorporated herein by reference conflict with the present disclosure, the present disclosure controls.

While the above description describes various embodiments of the technology and the best mode contemplated, regardless how detailed the above text, the technology can be practiced in many ways. Details of the system may vary considerably in its specific implementation, while still being encompassed by the present disclosure. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims. From the foregoing, it will be appreciated that specific embodiments of the technology have been described herein for purposes of illustration, but that various modifications may be made without deviating from the spirit and scope of the various embodiments of the technology.

We claim:

1. An agricultural trellis system, comprising:
 an anchor stake having a major axis and configured to extend at least partially into a ground surface;
 a first mounting plate coupled to the anchor stake and a second mounting plate coupled to the first mounting plate, the second mounting plate being disposed on an opposite side of the anchor stake from the first mounting plate, the first and second mounting plates each having:
  a pivot aperture;
  at least two first alignment apertures positioned at a first radial distance away from the pivot aperture; and
  a second alignment aperture positioned at a second radial distance away from the pivot aperture, wherein the second radial distance is different than the first radial distance,
  wherein each of the apertures of the first mounting plate are axially aligned with the respective apertures of the second mounting plate;
 a trellis arm having an arm pivot aperture, a first arm alignment aperture positioned at the first radial distance away from the arm pivot aperture, and a second arm alignment positioned at the second radial distance away from the arm pivot aperture, wherein the trellis arm is positioned between the first and second mounting plates and pivotably coupled through the pivot apertures and the arm pivot aperture, the trellis arm pivotable between:
alignment of the first arm alignment aperture with one of the at least two first alignment apertures, wherein the trellis arm is disposed at a first angle relative to a plane orthogonal to the major axis of the anchor stake;
alignment of the first arm alignment aperture with the other of the at least two first alignment apertures, wherein the trellis arm is disposed at a second angle relative to a plane orthogonal to the major axis of the anchor stake; and
alignment of the second arm alignment aperture with the second alignment apertures, wherein the trellis arm is disposed at a third angle relative to the plane that is different than the first and second angles; and
a removable pin coupling the trellis arm to the first and second mounting plates through one of the at least two first alignment apertures and the first arm alignment aperture or through the second alignment apertures and the second arm alignment aperture.

2. The agricultural trellis system of claim 1, wherein the pivot aperture comprises a first pivot aperture and first and second mounting plates each further comprises a second pivot aperture, a third alignment aperture, and a fourth alignment aperture, wherein the trellis arm comprises a first trellis arm and the removable pin comprises a first removable pin, and wherein the agricultural trellis system further comprises:
a second trellis arm pivotably coupled to the first and second mounting plates through the second pivot apertures, the second trellis arm pivotable between:
alignment with the third alignment apertures, wherein the second trellis arm is disposed at a fourth angle relative to the plane; and
alignment with the fourth alignment apertures, wherein the second trellis arm is disposed at a fifth angle relative to the plane that is different than the fourth angle; and
a second removable pin coupling the second trellis arm to the first and second mounting plates through the third alignment apertures or the fourth alignment apertures.

3. The agricultural trellis system of claim 2, wherein the first angle and the fourth angle are at least approximately equal, and wherein the second angle and the fifth angle are at least approximately equal.

4. The agricultural trellis system of claim 2, wherein the first trellis arm is coupled to the first and second mounting plates at the first angle via the first alignment apertures, and wherein the second trellis arm is coupled to the first and second mounting plates at the fifth angle via the fourth alignment apertures, such that the first and second trellis arms are disposed at different angles relative to the plane.

5. The agricultural trellis system of claim 2, further comprising a cross brace coupled to the first and second trellis arms and spaced apart from the first and second mounting plates.

6. The agricultural trellis system of claim 2, further comprising a hoop coupled to a distal end of the first trellis arm and coupled to a third trellis arm of an adjacent agricultural trellis system, wherein the hoop is configured to support an agricultural fabric.

7. The agricultural trellis system of claim 1, wherein the first and second mounting plates each further comprise an intermediate alignment aperture, wherein the trellis arm is pivotable to align with the intermediate alignment apertures at which the trellis arm is disposed at an intermediate angle relative to the plane that is between the first and second angles.

8. The agricultural trellis system of claim 1, wherein the first angle is between about 60° and about 78°, and wherein the second and third angles are between about 70° and about 80°.

9. The agricultural trellis system of claim 1, wherein the difference between the first and second angles is between about 2° and about 10°.

10. An agricultural trellis system, comprising:
an anchor stake having a major axis and configured to extend at least partially into a ground surface;
a first mounting plate coupled to the anchor stake and second mounting plate coupled to the first mounting plate, the second mounting plate being disposed on an opposite side of the anchor stake from the first mounting plate, the first and second mounting plates each having:
a first pivot aperture;
a second pivot aperture;
at least two first alignment apertures positioned at a first radial distance away from the first pivot aperture;
a second alignment aperture positioned at a second radial distance away from the first pivot aperture, wherein the second radial distance is different than the first radial distance;
a third alignment aperture, and
a fourth alignment aperture,
wherein each of the apertures of the first mounting plate are axially aligned with the respective apertures of the second mounting plate;
a first trellis arm having an arm pivot aperture, a first arm alignment aperture positioned at the first radial distance away from the arm pivot aperture, and a second arm alignment positioned at the second radial distance away from the arm pivot aperture, wherein the trellis arm is positioned between the first and second mounting plates and pivotably coupled through the first pivot apertures and the arm pivot aperture, the first trellis arm pivotable between:
alignment of the first arm alignment aperture with one of the at least two first alignment apertures, wherein the first trellis arm is disposed at a first angle relative to a plane orthogonal to the major axis of the anchor stake;
alignment of the first arm alignment aperture with the other of the at least two first alignment apertures, wherein the first trellis arm is disposed at a second angle relative to the plane orthogonal to the major axis of the anchor stake; and
alignment of the second arm alignment aperture with the second alignment apertures, wherein the first trellis arm is disposed at a third angle relative to the plane that is different than the first and second angles; and
a second trellis arm pivotably coupled to the first and second mounting plates at the second pivot aperture, the second trellis arm pivotable between:
alignment with the third alignment apertures, wherein the second trellis arm is disposed at a fourth angle relative to the plane; and
alignment with the fourth alignment apertures, wherein the second trellis arm is disposed at a fifth angle relative to the plane that is different than the fourth angle.

11. The agricultural trellis system of claim 10, further comprising:
- a first removable pin coupling the first trellis arm to the first and second mounting plates via one of the at least two first alignment apertures or the second alignment apertures; and
- a second removable pin coupling the second trellis arm to the first and second mounting plates via the third alignment apertures or the fourth alignment apertures.

12. The agricultural trellis system of claim 10, wherein the first angle and the fourth angle are at least approximately equal, and wherein the second angle and the fifth angle are at least approximately equal.

13. The agricultural trellis system of claim 10, wherein the first trellis arm is coupled to the first and second mounting plates at the first angle via one of the at least two first alignment apertures, and wherein the second trellis arm is coupled to the first and second mounting plates at the fifth angle via the fourth plate apertures, such that the first and second trellis arms are disposed at different angles from the plane.

14. The agricultural trellis system of claim 10, further comprising a cross brace coupled to the first and second trellis arms and spaced apart from the first and second mounting plates.

15. The agricultural trellis system of claim 10, further comprising a hoop coupled to a distal end of the first trellis arm and coupled to a third trellis arm of an adjacent agricultural trellis system, wherein the hoop is configured to support an agricultural fabric.

16. The agricultural trellis system of claim 10, wherein the first and second mounting plates each further comprise a first intermediate alignment aperture and a second intermediate alignment aperture, wherein the first trellis arm is pivotable to align with the first intermediate alignment aperture such that the first trellis arm is disposed at a first intermediate angle from the plane that is between the first and second angles, and wherein the second trellis arm is pivotable to align with the second intermediate alignment aperture such that the second trellis arm is disposed at a second intermediate angle from the plane that is between the fourth and fifth angles.

17. The agricultural trellis system of claim 10, wherein the first angle is between about 60° and about 78°, the second and third angles are between about 70° and about 80°, the fourth angle is between about 60° and about 78°, the fifth angle is between about 70° and about 80°.

18. The agricultural trellis system of claim 10, wherein the difference between the first and second angles is between about 2° and about 10°, and wherein the difference between the fourth and fifth angles is between about 2° and about 10°.

\* \* \* \* \*